(12) United States Patent
Bray et al.

(10) Patent No.: US 10,834,652 B2
(45) Date of Patent: Nov. 10, 2020

(54) ELECTRONIC COMMUNICATION NODE LOAD BALANCING SYSTEM AND METHOD

(71) Applicant: Mitel Networks ULC, Vancouver (CA)

(72) Inventors: Michel Bray, Nepean (CA); Zoe Knox, Kanata (CA); Lee Dilkie, Stittsville (CA)

(73) Assignee: Mitel Networks Corporation, Ottawa (CA)

(*) Notice: Subject to any disclaimer, the term of this patent is extended or adjusted under 35 U.S.C. 154(b) by 12 days.

(21) Appl. No.: 16/232,458

(22) Filed: Dec. 26, 2018

(65) Prior Publication Data

US 2020/0213923 A1 Jul. 2, 2020

(51) Int. Cl.
| | |
|---|---|
| *H04W 36/30* | (2009.01) |
| *H04B 17/318* | (2015.01) |
| *H04B 17/336* | (2015.01) |
| *H04B 17/382* | (2015.01) |
| *H04L 12/24* | (2006.01) |
| *H04L 29/06* | (2006.01) |
| *H04L 29/08* | (2006.01) |

(52) U.S. Cl.
CPC .......... *H04W 36/30* (2013.01); *H04B 17/318* (2015.01); *H04B 17/336* (2015.01); *H04B 17/382* (2015.01); *H04L 41/12* (2013.01)

(58) Field of Classification Search
None
See application file for complete search history.

(56) References Cited

U.S. PATENT DOCUMENTS

| | | | |
|---|---|---|---|
| 7,480,264 B1* | 1/2009 | Duo | H04L 47/10 370/310.2 |
| 10,523,733 B1* | 12/2019 | Bharrat | H04L 65/1069 |
| 2004/0229621 A1* | 11/2004 | Misra | H04W 16/08 455/445 |
| 2011/0026516 A1 | 2/2011 | Roberts et al. | |
| 2015/0085829 A1* | 3/2015 | Bawaskar | H04W 36/26 370/332 |
| 2018/0077229 A1* | 3/2018 | Bharrat | H04L 65/1006 |

\* cited by examiner

*Primary Examiner* — Faruk Hamza
*Assistant Examiner* — Cassandra L Decker

(57) ABSTRACT

A method and system for distributing communication devices across a cluster of network nodes are disclosed. The method and system can use call statistics information to determine which node within the cluster to use to register one or more communication devices. The system and method can additionally periodically review such information and register the communication devices to other nodes based on the information.

17 Claims, 3 Drawing Sheets

ELECTRONIC COMMUNICATION NODE LOAD BALANCING SYSTEM AND METHOD

FIELD OF THE INVENTION

The present disclosure generally relates to electronic communication methods and systems. More particularly, the disclosure relates to electronic communication systems that include a cluster of network nodes and to methods of using such systems.

BACKGROUND OF THE DISCLOSURE

A network node, such as a session border controller (SBC), can perform a variety of tasks in packet-switched networks, such as internet protocol (IP) networks, and can be used in a variety of network configurations. For example, an SBC can be used to provide enhanced security of IP communications, provide enhanced quality of service of IP communications, provide session routing across network interfaces, and the like. By way of particular examples, one or more SBCs can be placed at an edge of an enterprise network to provide these and/or similar services to the enterprise network.

As a number of communication devices connecting to an enterprise network grows and consequently communication traffic volume to the network increases, a number of SBCs to provide SBC services at the edge of the enterprise network generally increases. To distribute the workload of the SBCs, the SBCs can be configured as a cluster, wherein each SBC constitutes a node or element within the cluster.

Load balancing techniques can be used to distribute communication device traffic across the nodes of the cluster. If all of the nodes can handle the same amount of traffic, the communication devices may be evenly distributed across the nodes. Otherwise, the nodes may be manually weighted, with nodes able to handle more communication devices given a higher weight than nodes that can handle fewer communication devices, such that more communication devices are registered to the nodes with the higher weighting.

Typically, once a communication device is registered with a node, such communication device generally stays registered with that node, unless an event, such as a node failure, a configuration change, or an addition of a new device causes a redistribution and reregistering of the communication device.

While such techniques can work relatively well, as the number of communication devices connecting to nodes and/or an amount of information transmitted through a node or a cluster of nodes increases, it becomes more desirable to have more efficient allocation of node resources. Accordingly, improved systems and methods for allocating traffic through nodes of a cluster are desired.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems that provide improved load balancing between network nodes in a cluster. The methods and systems described herein allow for more efficient use of network nodes, allowing fewer nodes to handle an increase in a number of devices coupled to a cluster and/or increased communication volume through a cluster, without a degradation in service, which might otherwise be experienced.

Various embodiments of exemplary systems and methods described in more detail below are directed systems that include a cluster including a plurality of session border controllers. However, unless otherwise noted, the disclosure is not so limited.

Figure 1:
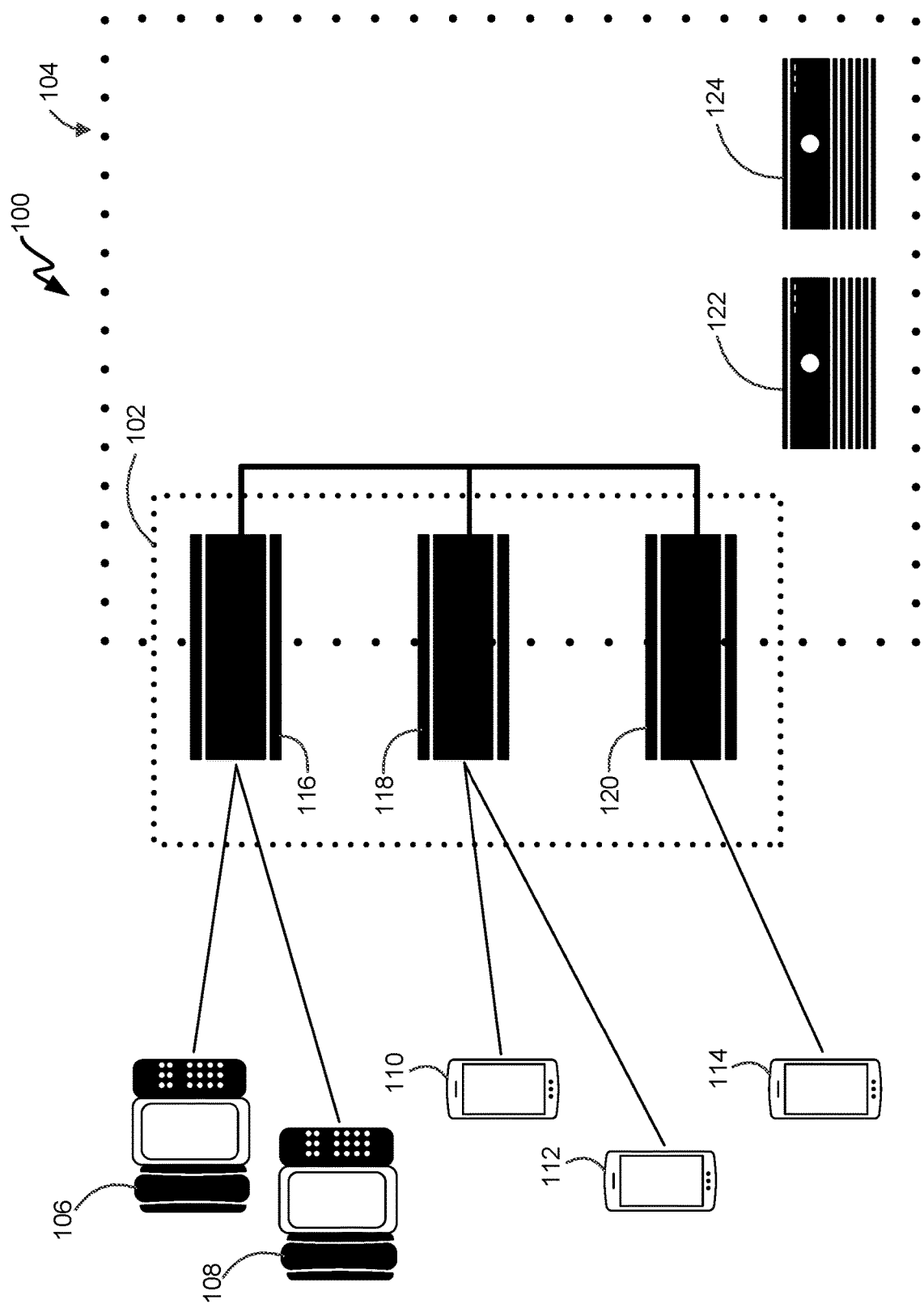
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. Electronic communication system 100 includes a cluster 102, a network 104, and one or more communication devices 106-114.

Cluster 102 includes a plurality of network elements or nodes (generally referred to herein simply as nodes) 116-120. Although illustrated with three nodes 116-120, clusters in accordance with the present disclosure can include any suitable number of nodes.

Typically, communication loads though each node 116-120 would be evenly distributed or distributed based on weighting of the load assigned to each node. Such configurations result in inefficient use of resources, poor quality of service, and/or over engineering of communications systems. In contrast, the systems and methods described herein can alleviate such problems by, for example, accounting for typical use of nodes 116-120 and/or communication devices 106-114.

Further, typical communication systems generally register a communication device 106, 108, 110, 112, or 114 with a node 116, 118, or 120, and that communication device generally stays registered to the node until an event, such as a node failure, occurs. In contrast, as discussed below, communication devices 106-114 can be periodically redistributed to various nodes within cluster 102 using system 100 and methods described herein.

Figure 4:
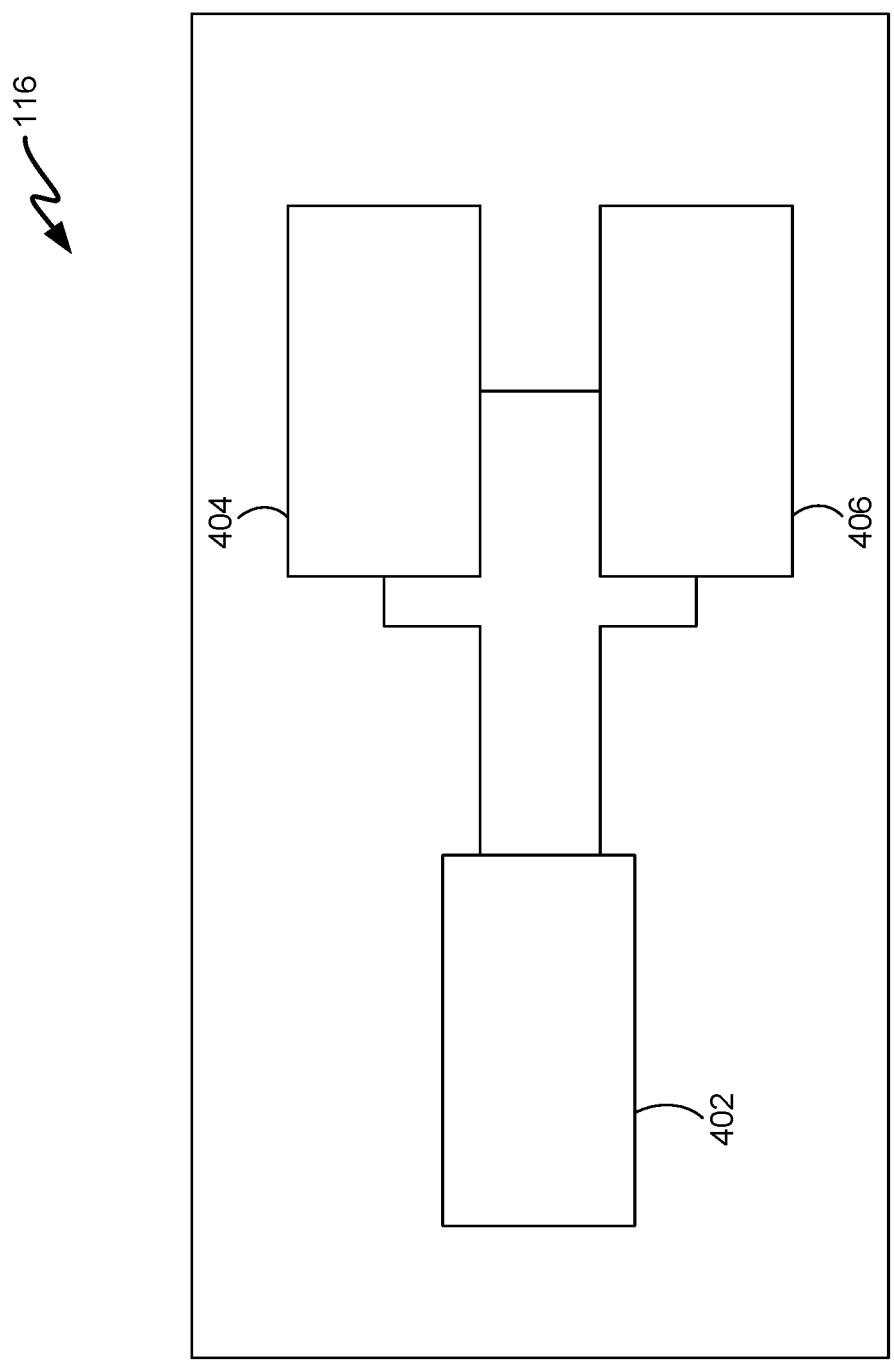
FIG. 4 illustrates a node in accordance with further exemplary embodiments of the disclosure.

FIG. 4 illustrates node 116 in greater detail. Other nodes, including nodes 118, 120, within cluster 102 may be similarly configured. By way of example, node 116 can be or include a session border controller—e.g., a session border controller located at an edge of network 104. However, other configurations are also contemplated by the present disclosure. Further, as illustrated in FIG. 1 and as described herein, information, such as communication information, is shared between the nodes, so that a "best node" for each communication device registration can be determined.

Node 116 includes at least one processor 402, a memory 404 operatively coupled to the processor, and optionally a storage medium 406 to store information, which can share information with processor 402 and/or memory 404. As set forth in more detail below, memory 404 can store program instructions that when executed by processor 402, causes processor 402 to access communication information in at least one storage medium 406, determine which communication device 106-114 of the plurality of communication devices 106-114 to register with network node 116 based on the communication information, and register one or more of the plurality of communication devices based on the step of determining which communication device of the plurality of communication to register with network node 116. As set forth in more detail below, cluster 102 can also periodically update and review the communication information and redistribute one or more communication devices 106-114 from one node 116-120 to another node 116-120 based on the review.

Network node 116, in combination with other network nodes (e.g., nodes 118, 120) within cluster 102, can determine which node has one or more of a strongest communication signal (e.g., using a ping from the node or communication device) between each of the plurality of communication devices and each node and a highest quality of communication between each of the plurality of communication devices and each node. Such information can be collected each time a device registers with cluster 102 and thereafter periodically, as described below. This information can be stored in storage medium 406 or elsewhere. This information can be used to determine which communication device 106-114 is coupled to which node 116-118.

Processor 402 can include one or more processing units or microprocessors that interpret and execute coded instructions. In other implementations, processor 402 can be implemented by or include one or more application-specific integrated circuits (ASICs), field programmable gate arrays (FPGAs), or the like. In accordance with some embodiments of the disclosure, processor 402 can be further configured to monitor communication quality and/or strength, and the processor can cause a communication device of the plurality of communication devices to register with another node if the communication quality/strength is below a threshold.

Memory 404 can include a random-access memory (RAM) or another type of dynamic storage device that stores information and instructions for execution by processor 402. Memory 404 can also include a read-only memory (ROM) or another type of static storage device that stores static information and instructions for processor 402. Memory 404 and/or storage medium 406 can include other types of magnetic or optical recording medium and its corresponding drive for storing information and/or instructions. Further, although illustrated as part of node 116, storage medium 206 can be located elsewhere within node 116, within cluster 102, and or within network 104.

In accordance with various embodiments of the disclosure, the communication information includes information associated with each network node of the plurality of network nodes. The communication information can include, for example, call statistics to predict when communication devices 106-114 will likely be active and use one or more of nodes 116-120. Communication devices can then be distributed to one of nodes 116-120 based on the communication information.

Exemplary communication information includes time and corresponding activity level for the node and for other nodes in the cluster, call statistics, such as usage data and corresponding time for each communication device 106-114, call rates, idle times for nodes 116-120 and/or communication devices 106-114, communication duration for each communication device 106-114, peak usage times for nodes 116-120 and/or communication devices 106-114, any combination of such information, and the like. Communication information can also include a weight associated with each node (the higher the weight, the more communication devices can be connected to the node). Alternatively, the weight information can be hard coded into the nodes and/or stored elsewhere. Communication information can include absolute values, averages, and/or weighted averages for such information. As discussed in more detail below, packet loss and/or communication quality can also be monitored and communication devices 106-114 can additionally be redistributed based on call quality information. Such call quality information can also be stored in storage medium 406.

The communication information can be periodically updated using processor 402 and memory 404. For example, communication information can be updated at predetermined time intervals—e.g., every, 5, 10, 15, 30, 60 minutes or the like. Additionally or alternatively, the communication information can be updated based on new device and/or user registration, a node failure, a node or communication device configuration change, or the like. Further, the communication information can be formatted and stored—e.g., in medium 406—in a variety of formats. For example, information could be segregated and stored in seven daily tables, weekday and weekend tables, or within a single table. In accordance with some embodiments of the disclosure, a format for storing communication information can be selected and/or configured by a user. Additionally or alternatively, a user could specify which and/or weight various call statistics to consider when processor 402 redistributes communication devices 106-114 to nodes 116-120.

Returning again to FIG. 1, network 104 can include or be, for example, an internet protocol (IP) network. Exemplary types of networks suitable for network 104 include a local area network, a wide-area network, a metropolitan area network, wireless networks, or the Internet. Various components of network 104 can be coupled to one or more other components using an Ethernet connection, other wired connections, and/or wireless interfaces. Network 104 can be coupled to other networks and/or to other devices typically coupled to networks. By way of examples, network 104 can include a communication network, such as an enterprise or service provider network. In the illustrated example, network 104 includes a call server 122 and an application server 124.

Communication devices 106-114 can be or include any suitable device with wired or wireless communication features that can connect to network 104. For example, communication devices 106-114 can be or include a wearable device, a tablet computer, a wired phone, a mobile phone, a personal (e.g., laptop or desktop) computer, a streaming device, such as a game console or other media streaming device, or the like.

Although not separately illustrated, system 100 can also include a private branch exchange (PBX), a Public Switched Telephone Network (PSTN) and/or a mobile network to allow one or more of devices 106-114 to cluster 102.

Figure 2:
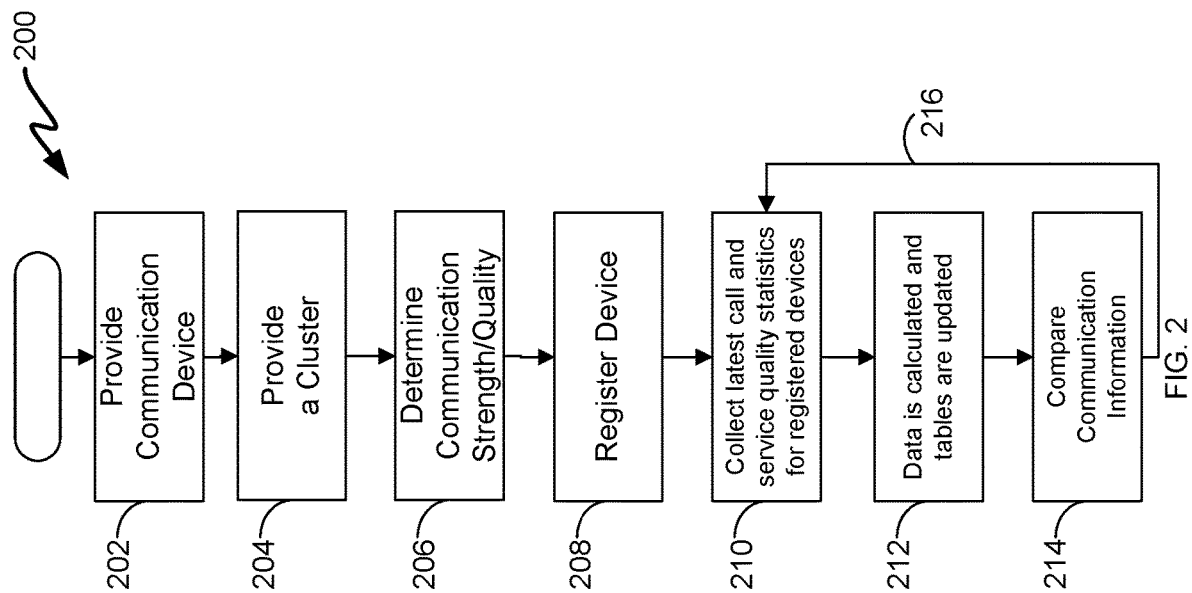
FIG. 2 illustrates an electronic communication method in accordance with exemplary embodiments of the disclosure.

Turning now to FIG. 2, an exemplary electronic communication method 200 in accordance with exemplary embodiments of the disclosure is illustrated. Electronic communication method 200 includes the steps of providing a communication device (step 202), providing a cluster (step 204), determining communication strength/quality (step 206), registering the device (step 208), collecting call statistics and/or quality information (step 210), updating the communication information (step 212), comparing communication information (step 214), and repeating loop (step 216).

During step 202, a communication device, such as one of communication devices 106-114, is provided. During step 204, a cluster, such as cluster 102, is provided.

At step 206, a cluster determines one of more of a communication strength and a communication quality between the (each) communication device and between one or more, e.g., each (active) node in the cluster. A communication strength can be determined using, for example, a ping between the communication device and the nodes. Additionally or alternatively, voice or other communication quality (e.g., packet loss or the like) information can be used to determine which node/communication device pairing has the strongest signal and/or communication quality.

At step 208, a device is registered with a network node of the cluster based on the communication information, such as one of more of a communication strength and a communication quality between the device and between one or more, e.g., each (active) node in the cluster. Once the device is registered, additional communication information, including call statistics, such as call statistics described herein, are collected and stored—e.g., in storage medium 406 at step 210. During step 212, data continues to be collected—e.g., based on a predetermined time or the like. At step 214, communication information between nodes of a cluster is compared.

Figure 3:
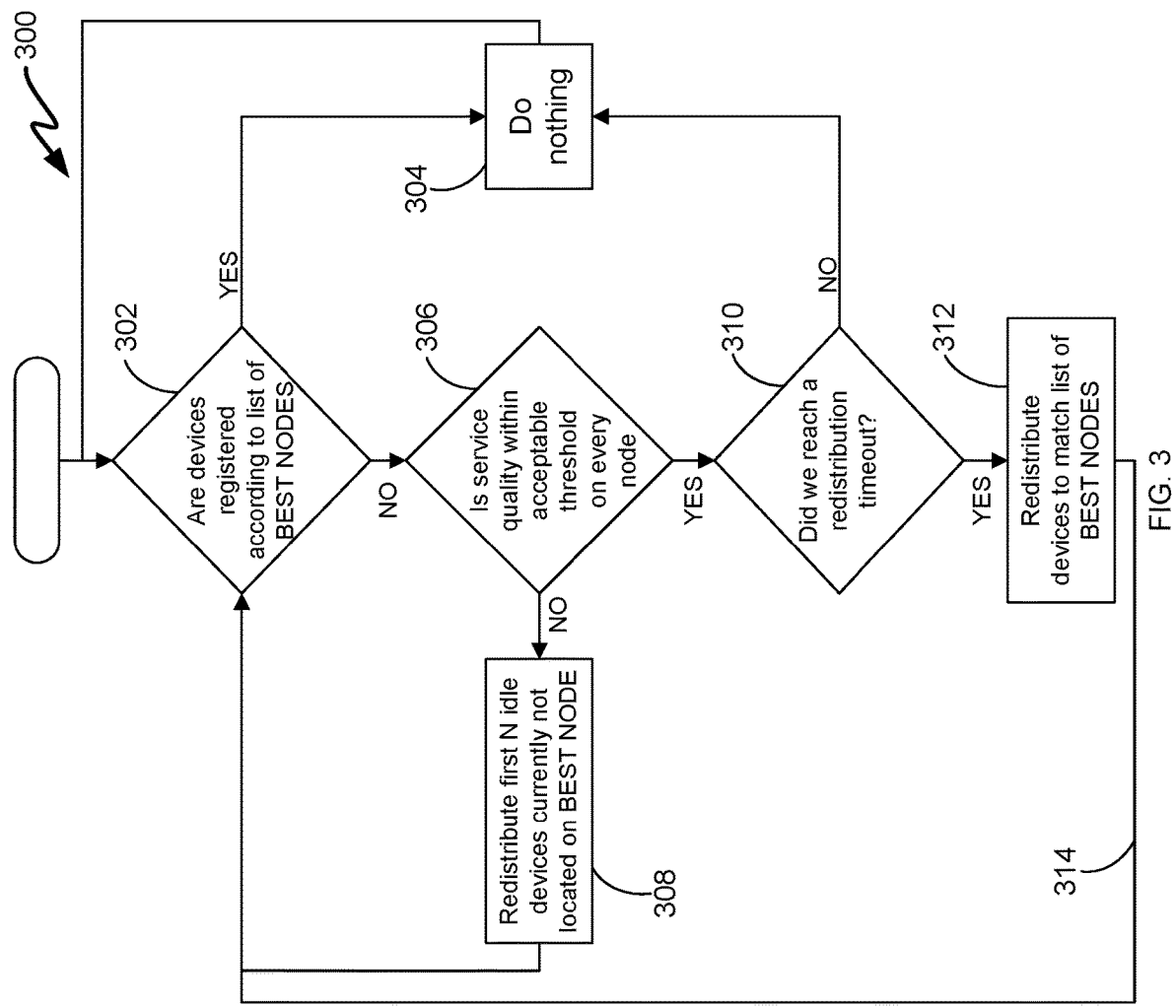
FIG. 3 illustrates another electronic communication method in accordance with exemplary embodiments of the disclosure.

FIG. 3 illustrates another electronic communication method 300 in accordance with further exemplary embodiments of the disclosure. Although separately illustrated, electronic communication method 200 and electronic communication method 300 can be considered part of a same method. Further, electronic communication method 200 and electronic communication method 300 can run concurrently.

Method 300 includes the steps of determining if communication devices are registered to the correct node (e.g., the communication device/node with the highest communication quality and/or strength). The determination can be based on, for example, step 214 of electronic communication method 200. If the determination at step 302 is yes, then method 300 can proceed to step 304. If the determination at step 302 is no, then method 300 proceeds to step 306 and determines whether a quality of the communication (e.g., voice quality and/or data quality) is above a threshold (step 306). If the determination at step 306 is no, then method 300 proceeds to step 308 of redistributing the device(s) to another node based on communication information collected during steps 210 and/or 212. If the determination at step 306 is yes, then method 300 proceeds to step 310 of determining whether a time for redistributing the device(s) has exceeded a threshold. If the determination at step 310 is no, then method 310 proceeds to step 304. If, on the other hand, the determination at step 310 is yes, then method 300 proceeds to step 312 and redistributes one or more (e.g., all) devices to the nodes determined in step 214. Electronic communication method 300 then repeats as illustrated by loop 314.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. For example, although various examples are described above in connection with session border controllers at an edge of a network, the features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. An electronic communication system comprising:
a cluster comprising a plurality of network nodes; and
a plurality of communication devices coupled to the cluster, wherein each of the plurality of network nodes comprises at least one processor and a memory operatively coupled to the at least one processor, the memory storing program instructions that, when executed by the processor, cause the processor to:
access communication information in at least one storage medium of a plurality of storage media, the communication information comprising information associated with each network node of the plurality of network nodes;
determine which communication device of the plurality of communication devices to register with each network node based on the communication information; and
register one or more of the plurality of communication devices based on the step of determining which communication device of the plurality of communication devices to register,
wherein a combination of the plurality of network nodes determines the communication information comprising which network node of the plurality of network nodes has one or more of a strongest communication signal to each of the plurality of communication devices and a highest quality of communication to each of the plurality of communication devices, and
wherein each network node comprises a respective one of the at least one storage medium.

2. The electronic communication system of claim 1, wherein the strongest communication signal is based on a ping.

3. The electronic communication system of claim 1, wherein results of the step of determining which node has one or more of a strongest communication signal to each of the plurality of communication devices and a highest quality of communication to each of the plurality of communication devices are stored in the plurality of storage media.

4. The electronic communication system of claim 1, wherein the communication information comprises one or more of call statistic information, cluster node activity information, and communication quality information for each communication device.

5. The electronic communication system of claim 1, wherein the communication information is updated based on one or more of a predetermined time interval, a new device registration, and a device configuration.

6. The electronic communication system of claim 5, wherein at least one of the plurality of communication devices is registered to another network node of the plurality of network nodes based on the updated communication information.

7. The electronic communication system of claim 1, wherein the processor is further configured to monitor communication quality, and wherein the processor causes a communication device of the plurality of communication devices to register with another node if the communication quality is below a threshold.

8. An electronic communication method comprising the steps of:
providing a communication device;
providing a cluster comprising a plurality of network nodes;
determining one or more of a communication signal strength and a communication quality of a communication between the communication device and each of the plurality of network nodes;
storing communication information comprising information corresponding to one or more of the communication signal strength and the communication quality in a storage medium associated with each network node; and
registering the communication device with a network node of the plurality of network nodes based on the communication information,
wherein a combination of the plurality of network nodes determines the communication information comprising which network node of the plurality of network nodes has one or more of a strongest communication signal to each of the plurality of communication devices and a highest quality of communication to each of the plurality of communication devices.

9. The electronic communication method of claim 8, wherein the step of storing communication information comprises storing information corresponding to activity of each network node.

10. The electronic communication method of claim 8, wherein the step of storing communication information comprises storing information corresponding to the communication quality for the communication device.

11. The electronic communication method of claim 8, wherein the step of storing communication information comprises storing information corresponding to the communication quality for each of the plurality of network nodes.

12. The electronic communication method of claim 8, further comprising:
registering the communication device with another network node of the plurality of network nodes based on the communication information.

13. The electronic communication method of claim 8, wherein the step of determining a communication signal strength comprises using the communication device to ping each network node of the plurality of network nodes.

14. The electronic communication method of claim 8, further comprising a step of determining whether a quality of service for a communication for the communication device is below a threshold.

15. A network cluster comprising:
a plurality of network nodes, wherein each of the plurality of network nodes comprises: at least one processor; and
a memory operatively coupled to the at least one processor, the memory storing program instructions that when executed by the processor, cause the processor to:
access communication information in at least one storage medium of a plurality of storage media, the communication information comprising information associated with each network node of the plurality of network nodes;
determine which communication device of a plurality of communication devices to register with the network node based on the communication information; and
register one or more of the plurality of communication devices based on the step of determining which communication device of the plurality of communication devices to register,
wherein a combination of the plurality of network nodes determines the communication information comprising which network node of the plurality of network nodes has one or more of a strongest communication signal to each of the plurality of communication devices and a highest quality of communication to each of the plurality of communication devices, and
wherein each network node comprises a respective one of the at least one storage medium.

16. The network cluster of claim 15, wherein the plurality of network nodes determines which node has a strongest communication signal to each of the plurality of communication devices.

17. The network cluster of claim 15, wherein the communication information comprises one or more of call statistic information, cluster node activity information, and communication quality information for each device registered with each network node of the plurality of network nodes.

* * * * *